(12) United States Patent
Issler

(10) Patent No.: US 12,372,174 B2
(45) Date of Patent: Jul. 29, 2025

(54) TWO-PHASE CONNECTOR

(71) Applicant: Zelup, Lyons (FR)

(72) Inventor: Thomas Issler, Verin (FR)

(73) Assignee: Zelup, Lyons (FR)

( * ) Notice: Subject to any disclaimer, the term of this patent is extended or adjusted under 35 U.S.C. 154(b) by 0 days.

(21) Appl. No.: 18/694,756

(22) PCT Filed: Sep. 30, 2022

(86) PCT No.: PCT/FR2022/051849
§ 371 (c)(1),
(2) Date: Mar. 22, 2024

(87) PCT Pub. No.: WO2023/052734
PCT Pub. Date: Apr. 6, 2023

(65) Prior Publication Data
US 2024/0401727 A1 Dec. 5, 2024

(30) Foreign Application Priority Data

Sep. 30, 2021 (FR) ..................... 2110341

(51) Int. Cl.
*F16L 21/08* (2006.01)
*F16L 21/03* (2006.01)
*F16L 11/22* (2006.01)
(52) U.S. Cl.
CPC ............... *F16L 21/08* (2013.01); *F16L 21/03* (2013.01); *F16L 11/22* (2013.01)

(58) Field of Classification Search
CPC ......... F16L 39/00; F16L 39/005; F16L 39/02; F16L 37/24; F16L 37/244; F16L 37/248; F16L 37/56; F16L 37/565; F16L 37/18
See application file for complete search history.

(56) References Cited

U.S. PATENT DOCUMENTS

| | | | |
|---|---|---|---|
| 1,217,543 A | 2/1917 | White | |
| 4,111,466 A * | 9/1978 | Deregibus | F16L 39/02 285/239 |
| 4,732,414 A | 3/1988 | Inaba | |
| 4,763,683 A * | 8/1988 | Carmack | F16L 37/32 141/285 |

(Continued)

FOREIGN PATENT DOCUMENTS

DE 20004675 U1 8/2000

OTHER PUBLICATIONS

French Search Report for Application No. FR2110341 dated Jun. 9, 2022, 2 pages.

(Continued)

*Primary Examiner* — Aaron M Dunwoody
(74) *Attorney, Agent, or Firm* — TraskBritt

(57) ABSTRACT

A fluidic connection system for connecting two two-phase pipes includes two coaxial sleeves defining a central flow flowing through the inner sleeve and an annular flow flowing through the space between the inner sleeve and the outer sleeve. The connection system includes a second complementary connector that is configured to be fastened to the end of one of the two-phase pipes and a first complementary connector that is configured to be fastened to the complementary end of the other of the two-phase pipes.

7 Claims, 5 Drawing Sheets

(56) References Cited

U.S. PATENT DOCUMENTS

| | | | | |
|---|---|---|---|---|
| 5,779,277 | A * | 7/1998 | Street | F16L 37/252 |
| | | | | 285/86 |
| 8,074,687 | B2 * | 12/2011 | Queau | F16L 39/005 |
| | | | | 62/50.7 |
| 8,197,783 | B2 | 6/2012 | Masuda et al. | |
| 8,602,056 | B2 * | 12/2013 | Schutz | F16L 37/565 |
| | | | | 137/614.05 |
| 8,820,794 | B1 * | 9/2014 | Betz | F16L 39/02 |
| | | | | 285/123.6 |
| 8,919,783 | B2 | 12/2014 | Whitley | |
| 10,393,302 | B2 * | 8/2019 | Dill | F16L 23/12 |
| 2019/0309885 | A1 * | 10/2019 | Shamkhi | F16L 11/20 |
| 2020/0011468 | A1 * | 1/2020 | Dicken | F16L 1/26 |
| 2021/0061640 | A1 * | 3/2021 | Umemura | B67D 9/02 |
| 2021/0198878 | A1 * | 7/2021 | Lin | F16L 55/00 |

OTHER PUBLICATIONS

International Search Report for Application No. PCT/FR2022/051849 dated Jan. 23, 2023, 3 pages.

\* cited by examiner

TWO-PHASE CONNECTOR

CROSS-REFERENCE TO RELATED APPLICATIONS

This application is a national phase entry under 35 U.S.C. § 371 of International Patent Application PCT/FR2022/051849, filed Sep. 30, 2022, designating the United States of America and published as International Patent Publication WO 2023/052734 A1 on Apr. 6, 2023, which claims the benefit under Article 8 of the Patent Cooperation Treaty of French Patent Application Serial No. FR2110341, filed Sep. 30, 2021.

TECHNICAL FIELD

The present disclosure relates to the field of fluidics and more precisely to the connection by a connector of two ends of two-phase pipes having two coaxial ducts. Such pipes are, for example, intended to supply equipment with a liquid and air or a gas under pressure, or even to transfer two counter-flow liquids, in particular, two liquids or a liquid and a counter-flow gas.

Such pipes are, for example, used to supply pressurized water and pressurized air to a spray nozzle, for applications for scouring and cleaning surfaces such as sides of walls, vehicles or industrial equipment, or even for firefighting applications, in order to increase efficiency with reduced water consumption.

It is conventional to use two ducts, one to supply pressurized air, the other to supply pressurized water, which are interconnected using two separate connectors of the nozzle. "Mono-coupling" solutions have also been proposed in the prior art wherein the two phases are supplied coaxially to allow a single-step connection.

BACKGROUND

U.S. Pat. No. 1,217,543 discloses a pipe seal for double pipes with an inner pipe and a concentric rigid outer pipe and a seal consisting of an annular boss, the face of the member opposite the bored boss having two different diameters, the smallest counter-bore being adapted to adapt to the inner tube. The cooling liquid circulates in the inner tube, and the cooled liquid circulates in the annular space formed between the walls of the two tubes.

U.S. Pat. No. 4,732,414 discloses a coupling for coaxial pipes each having inner and outer pipes comprising:

a male joint part having an inner part for receiving an inner pipe of one of the coaxial pipes and having an internal bore communicating with the inner pipe, an outer cylindrical part for receiving the outer pipe of the one coaxial pipe, a bored body extending integrally from the outer part, the body defining a plurality of longitudinal bores between the body and the inner part for communicating with the outer pipe;

a female joint part having an inner part for receiving the inner pipe of the other of the coaxial pipes and having an internal bore communicating with the inner pipe of the other of the coaxial pipes, an outer cylindrical part for receiving the outer pipe of the other of the coaxial pipes, and a bored body extending integrally from the female joint bored body, the female joint bored body defining a plurality of longitudinal bores between the body and the female joint bored body to communicate with the outer pipe of the other of the coaxial pipes;

the inner parts of each of the male and female joint parts having on one end surface of the opposite protrusions and the outer parts of each of the male and female joint parts having opposite protrusions on the end surface distant from the outer cylindrical surface;

the bored body of one of the parts having a screw thread on its outer peripheral surface and the bored body of the other part having an outer flange on its peripheral surface;

a flat metal lining between the portions and having an internal passage connecting the internal bores of the inner parts and external passages connecting the longitudinal bores;

and means engaging the screw thread and the flange for locking the male and female parts together with the lining therebetween such that the opposite protrusions are pushed toward each other with the lining therebetween such that the protrusions are pressed and sealed against the lining and the internal bores and the longitudinal bores are sealed from one another and the atmosphere.

German Patent Publication No. DE20004675 discloses a fixed coupling for connecting a counter-coupling part, to which a pipe, in particular, a fire hose, is attached, to a fixed part, in particular, to a duct or a rigid coupling, the fixed coupling having a pipe side, a first ring with one to couple the counter-coupling part attached to the end face provided for the pipe, an end face, an elastic sealing ring provided on the end face and at least one claw projecting axially as part of a bayonet connection between the conjugated coupling part and the fixed coupling, characterized by a second ring that can rotate with the first ring and comprising means for fastening to the fixed part.

U.S. Pat. No. 8,919,783 discloses a seal intended to be used with coupling components, the seal being made of a compressible elastomer material and having a generally annular shape with a longitudinal axis, an inner peripheral surface facing radially inwards and an outer peripheral surface facing radially outwards, longitudinally opposite side surfaces, a positioning portion substantially adjacent to the outer peripheral surface, a compression sealing part substantially adjacent to the inner peripheral surface, and a connection part between the positioning part and the compression sealing part, the connection part having a longitudinal thickness substantially less than the longitudinal thickness of the compression sealing part, wherein at least one of the side surfaces of the compression sealing part comprises two outwardly facing ridges separated by an outwardly facing groove.

The solutions of the prior art are not completely satisfactory because they comprise a large number of moving parts making the sealing of the two phases difficult and requiring complex manipulations to ensure effective connection and locking.

Furthermore, the solutions of the prior art generally have parts that locally reduce the section of the duct, which causes pressure losses and hydraulic turbulence.

The solution described in U.S. Pat. No. 1,217,543 cannot be used with flexible pipes; the inner tube is modified to form an annular boss. This solution is, therefore, absolutely not applicable to a two-phase flexible hose.

Finally, the seal between the two fluid circuits is not always satisfactory in the prior art solutions.

BRIEF SUMMARY

In order to address these drawbacks, the present disclosure relates, in its most general sense, to a fluid connection system intended for the connection of two flexible two-phase pipes.

The pipes consist of two coaxial casings defining a central path flowing into the inner casing and an annular path flowing into the space between the inner casing and the outer casing, the coupling comprising a second connector intended to be attached to the end of one of the two-phase pipes and a first complementary connector intended to be attached to the complementary end of the other of the two-phase pipes.

The first connector has:
- a central connecting part whose distal end is configured to ensure the sealed connection with the end of the inner casing of one of the two-phase pipes; and
- a peripheral connecting part whose distal end is configured to ensure the sealed connection with the end of the outer casing of the two-phase pipe, the peripheral connecting part having an annular front inner flange, axially traversed by ports opening into the peripheral path,
- the central and peripheral connecting parts being assembled to define a transverse coupling surface.

The second connector has:
- a central connecting part whose distal end is configured to ensure the sealed connection with the end of the inner casing of the other of the two-phase pipes; and
- a peripheral connecting part whose distal end is configured to ensure the sealed connection with the end of the outer casing of the other two-phase pipe, the peripheral connecting part having an annular front inner flange, axially traversed by ports opening into the peripheral path,
- the central and peripheral connecting parts being assembled to define a second transverse front coupling surface.

The first connector and second connector having a locking means in the axial direction. The connector further comprises an annular sealing disc with axial ports corresponding to the axial ports in the front inner flanges.

According to a first variant, the first and second connectors have a locking means in the longitudinal direction.

According to a second variant, the first and second connectors have a means of a locking means in the angular and axial direction by relative rotation of a coupling ring bearing alternating annular shoulders and interlayer space, with a complementary coupling ring bearing alternating claws having annular shoulders.

Advantageously, the central part of the first connector consists of an inner sleeve extended by a disc shoulder and a coaxial tubular outer sleeve having a plurality of axial threaded holes, the inner sleeve and the tubular outer sleeve being configured to enclose the end of the inner casing of one of the two-phase pipes.

According to a particular embodiment, the peripheral part of the first connector consists of a sleeve having on the distal side a tubular lip whose diameter corresponds to the inner diameter of the outer casing, the sleeve having a plurality of axial threaded holes, the sleeve being extended on the proximal side by an inner collar through which axial holes pass, the collar defining a central port of a section corresponding to the section of the central sleeve, the sleeve being extended on the proximal side by a locking collar defining a cavity for receiving the end of the second connector; the peripheral connecting part further comprising a coaxial tubular outer sleeve having a plurality of axial holes, the inner sleeve and the tubular outer sleeve being configured to enclose the end of the outer casing of the two-phase pipe, the inner sleeve and the tubular outer sleeve being assembled by axial screws passing through the axial holes in the tubular outer sleeve in order to fit into the axial threaded holes of the sleeve.

Advantageously, the central connecting part and the peripheral connecting part being assembled by axial screws passing through the collar of the sleeve to fit into the axial threaded holes of the tubular outer sleeve of the central connecting part.

According to one variant, the central part of the second connector consists of an inner sleeve extended by a disc shoulder and a coaxial tubular outer sleeve having a plurality of axial holes, the inner sleeve and the tubular outer sleeve being configured to enclose the end of the inner casing of the other of the two-phase pipes.

According to a specific embodiment, the peripheral part of the second connector consists of a sleeve having on the distal side a tubular lip whose diameter corresponds to the inner diameter of the outer casing, the sleeve having a plurality of axial threaded holes, the sleeve being extended on the proximal side by an inner collar through which axial holes pass, the collar defining a central port, the sleeve being extended on the proximal side by a locking collar defining a cavity for receiving the end of the second connector; the peripheral connecting part further comprising a coaxial tubular outer sleeve having a plurality of axial holes, the inner sleeve and the tubular outer sleeve being configured to enclose the end of the outer casing of the two-phase pipe, the inner sleeve and the tubular outer sleeve being assembled by axial screws passing through the axial holes in the tubular outer sleeve in order to fit into the threaded holes of the sleeve.

BRIEF DESCRIPTION OF THE DRAWINGS

The present disclosure will be better understood on reading the following description, which concerns a non-limiting exemplary embodiment that is shown by the accompanying drawings, in which.

DETAILED DESCRIPTION

Description of an Example Coupling

Figure 1:
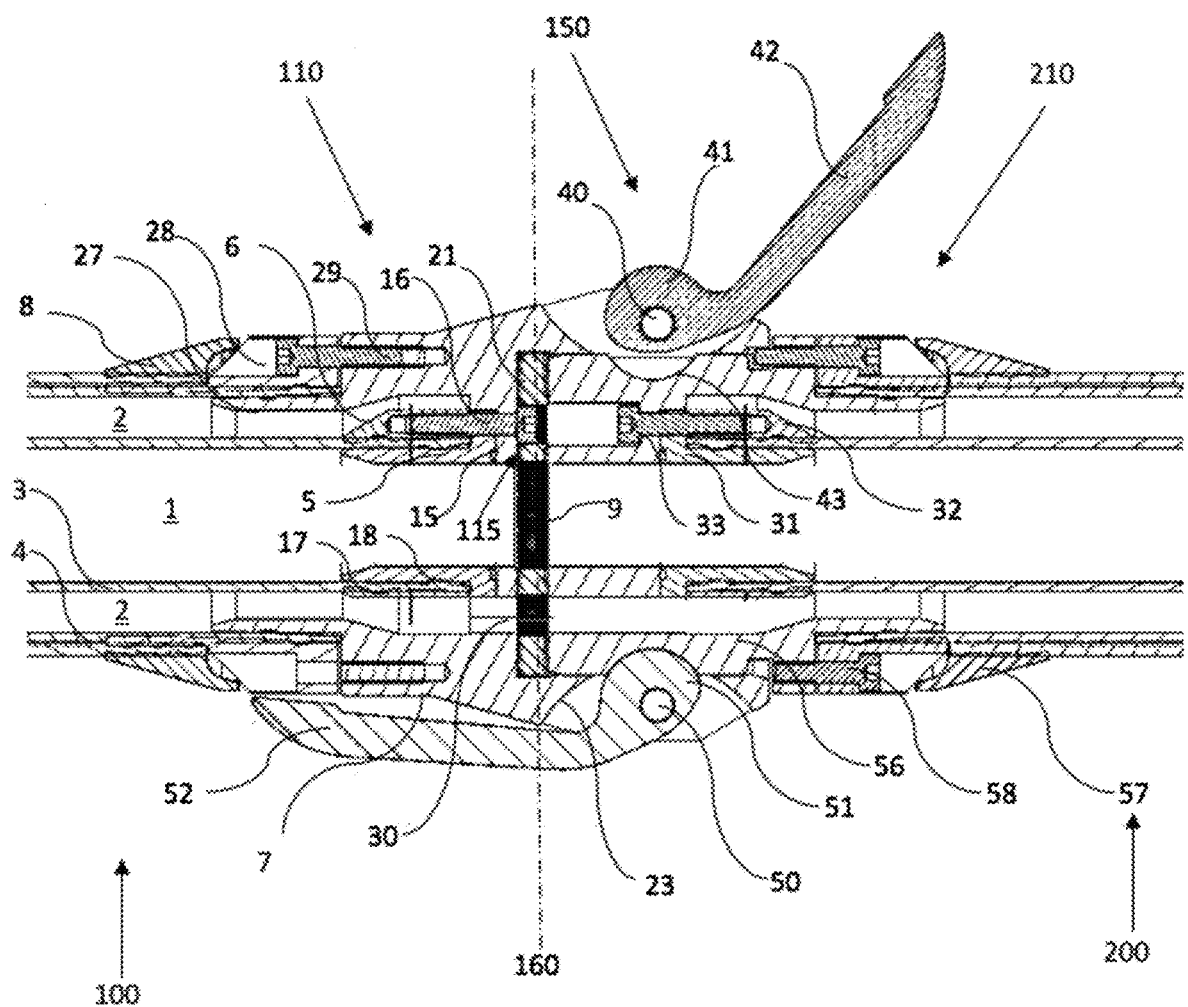
FIG. 1 shows a longitudinal cross-sectional view of a coupling according to a first variant of the disclosure.
Figure 2:
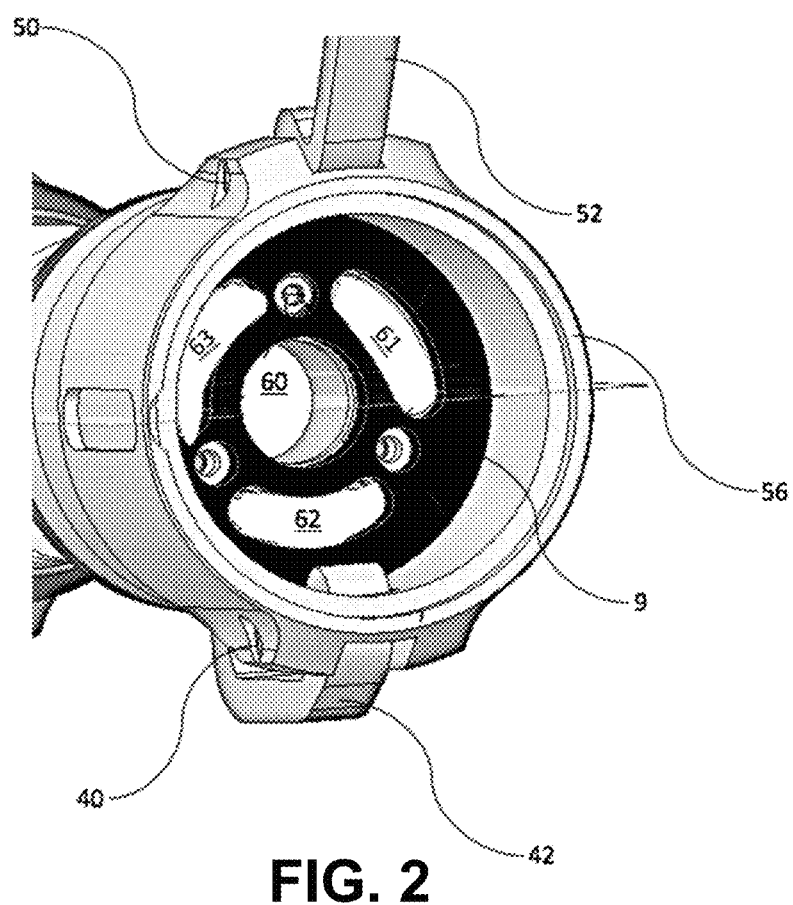
FIG. 2 shows a perspective view of the coupling equipped with a sealing disc according to a first variant of the disclosure.
Figure 3:
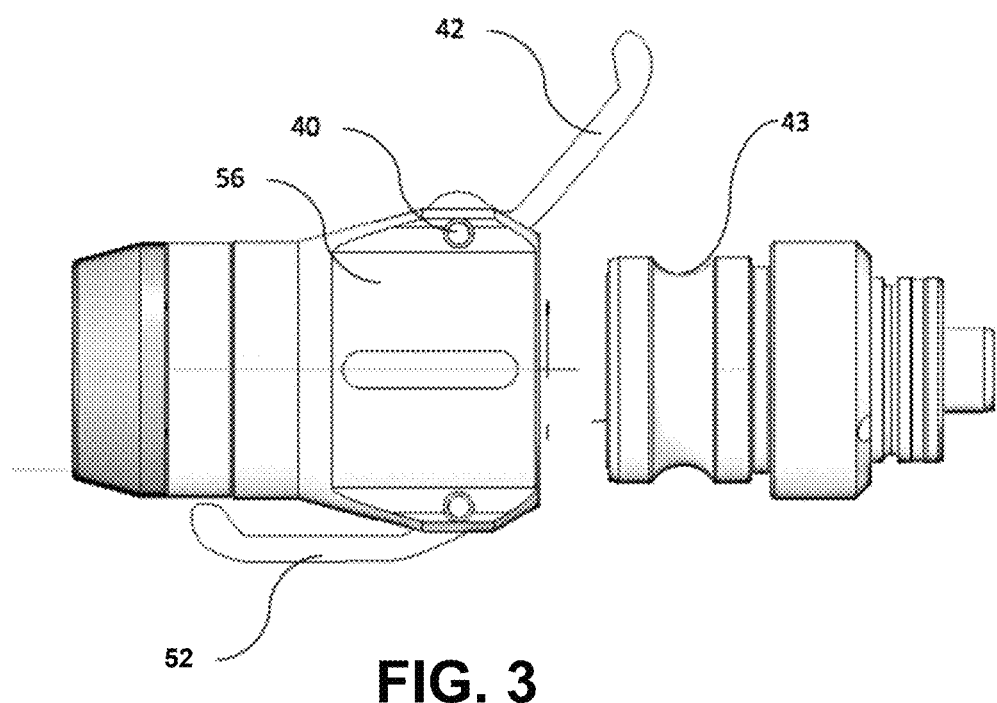
FIG. 3 shows a side view of a coupling according to a first variant of the disclosure.
Figure 4:
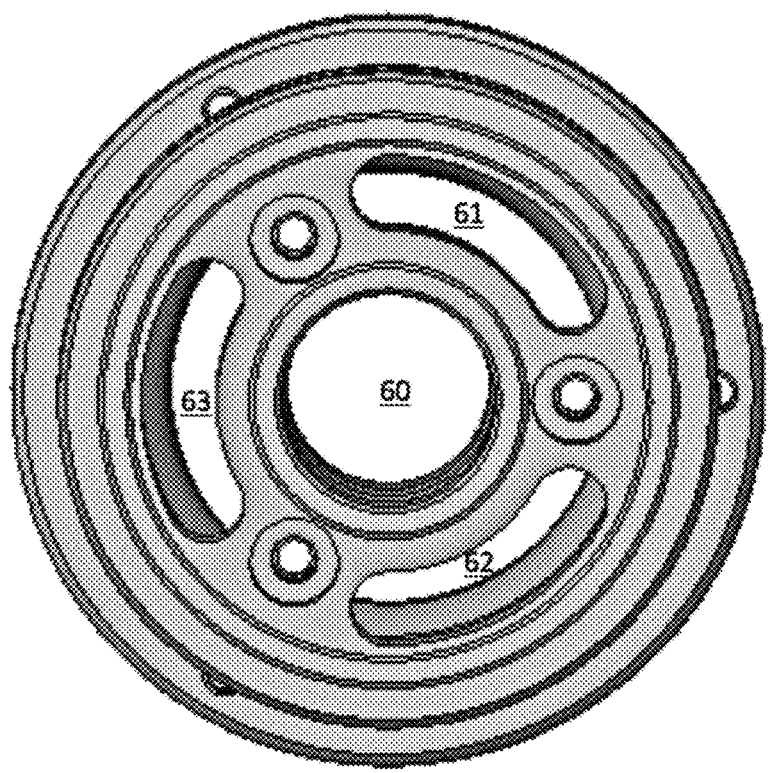
FIG. 4 shows a front view of a sealing disc according to the disclosure.
Figure 5:
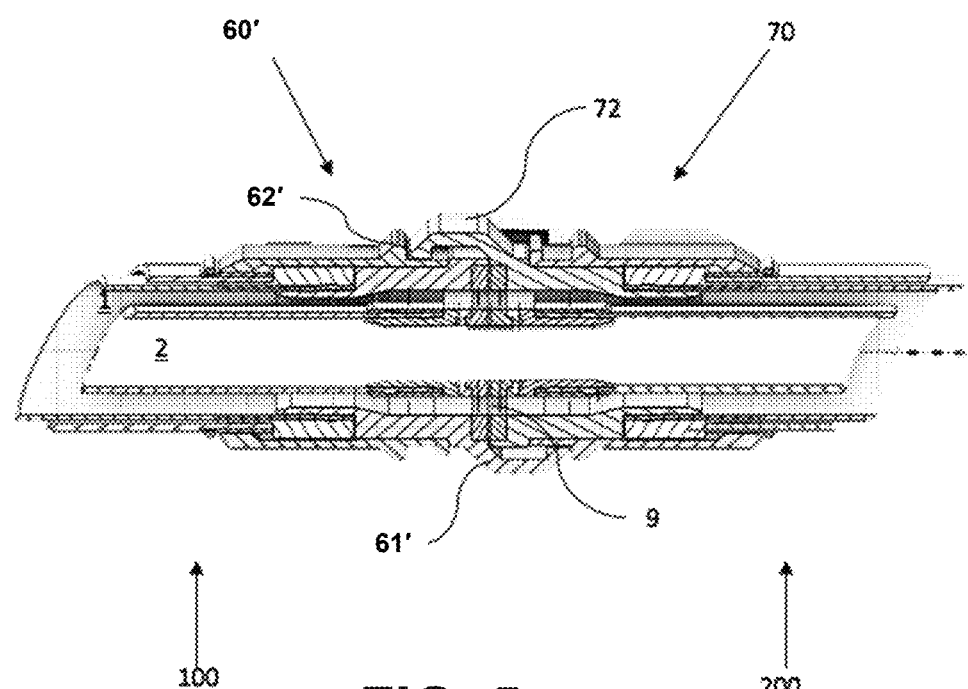
FIG. 5 shows a longitudinal cross-sectional view of an assembly of two couplings according to a second variant of the disclosure.
Figure 6:
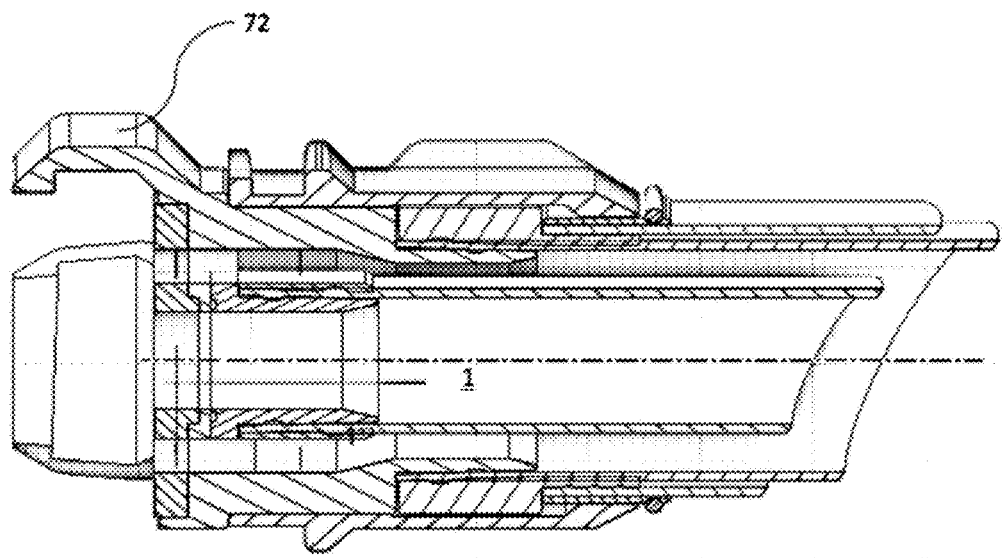
FIG. 6 shows a perspective cut-away view of a sealing coupling according to a second variant of the disclosure.
Figure 7:
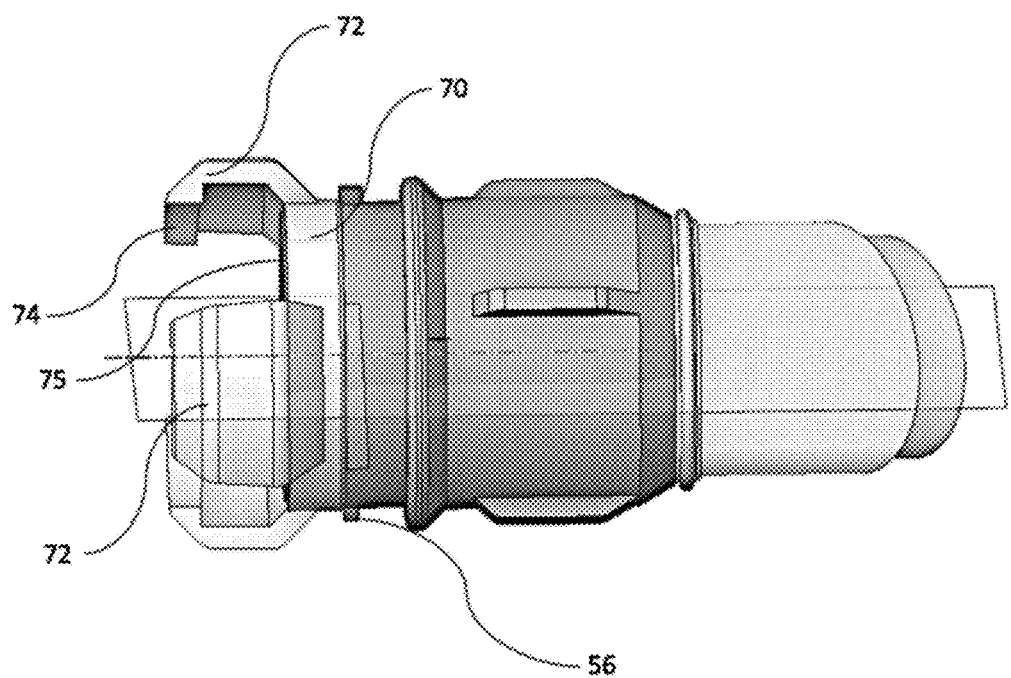
FIG. 7 shows a perspective view of a coupling according to a second variant of the disclosure.
Figure 8:
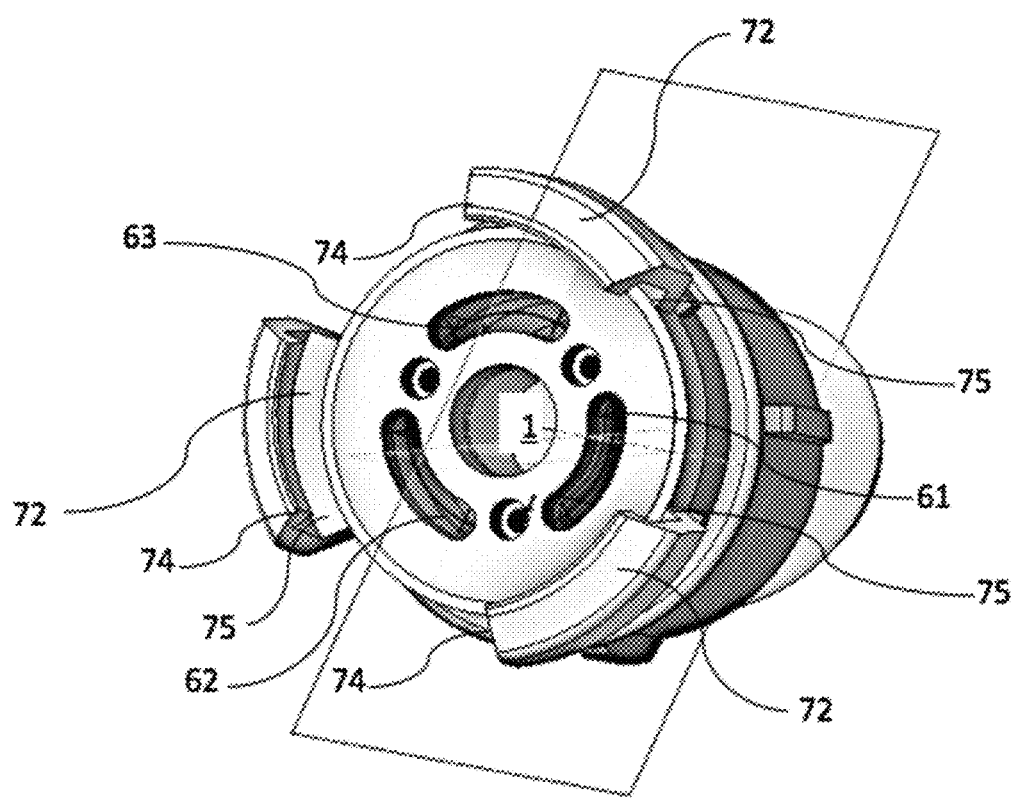
FIG. 8 shows a three-quarter front view of a coupling according to a second variant of the disclosure.

FIG. 1 shows a longitudinal cross-sectional view of two two-phase flexible pipes (100, 200) joined by a coupling according to the present disclosure.

The two-phase pipes consist of two concentric tubular casings (3, 4) defining a central path (1), delimited by the inner casing (3), and a peripheral path (2), defined by the annular space between the inner casing (3) and the outer casing (4). The fluid at the highest pressure preferably circulates in the central path (1) and the fluid at lower pressure circulates in the peripheral path (2).

The ends of the two two-phase flexible pipes (100, 200) are connected by a first complementary connector (110) and a second complementary connector (210).

Description of the First Coupling Unit

The first connector (110) consists of a central connecting part attached to the front end of the inner casing (3), and a peripheral connecting part attached to the front end of the outer casing (4).

"Front" refers to the side closest to the transverse median plane (160) corresponding to the interface of the two two-phase flexible pipes (100, 200), and "distal" refers to the side furthest from this transverse median plane (160).

The central connecting part consists of the first complementary connector (110) and consists of an inner sleeve (5) extended by a flared disc shoulder (15) and by a coaxial tubular outer sleeve (6). This coaxial tubular outer sleeve (6) is tapered from the distal side and may consist of tabs separated by longitudinal notches to limit disrupting the fluid flow circulating in the peripheral path (2). The coaxial tubular outer sleeve (6) flares on the distal side to form a flared disc shoulder (15) having a plurality of axial threaded holes, which are intended to receive the assembly screws (16) of the central connecting part and of the peripheral connecting part.

This inner sleeve (5) and the coaxial tubular outer sleeve (6) are configured to enclose the end of the inner casing (3) of the two-phase flexible pipe (100). They have annular grooves or splines (17, 18) intended to reinforce the anchoring of the inner casing (3) in the central connecting part.

The peripheral connecting part is attached to the front end of the outer casing (4).

The peripheral connecting part has a distal end configured to ensure the sealed connection with the end of the outer casing (4) of the two-phase flexible pipe (100).

The peripheral connecting part is formed by a sleeve (7) having an annular front collar (21) and a distal tubular skirt (27), solid or formed by alternating longitudinal teeth and slots. The outer casing (4) is wedged between this distal tubular skirt (27) and a peripheral sleeve (8) surrounding the outer end of the two-phase flexible pipe (100) and having longitudinal holes (28) intended for the passage of external screws (29) ensuring the connection with the sleeve (7).

The sleeve (7) has ports (30) passing transversely through the inner annular ring also passed through by the assembly screws (16) of the central connecting part and of the peripheral connecting part. These ports (30) are distributed over the periphery of this ring to allow the passage of fluid circulating in the peripheral path (2).

The central and peripheral connecting parts are assembled to define a transverse coupling surface (115).

The first complementary connector (110) is mounted by sliding the coaxial tubular outer sleeve (6) around the inner casing (3) and then engaging the inner sleeve (5) in the outer casing.

The coaxial tubular outer sleeve (6) is then placed around the outer casing (4), and the distal tubular skirt (27) of the sleeve (7) is inserted. The assembly is secured by the external screws (29) ensuring the tightening of the coaxial tubular outer sleeve (6) and the sleeve (7) around the outer casing (4), as well as the assembly of the central connecting part and the peripheral connecting part.

The sleeve (7) is extended, on the side opposite the distal tubular skirt (27), by a tubular ring (23) intended to receive the end of the male coupling. This tubular ring is traversed by several pivots (40, 50) extending in a transverse plane and distributed angularly around the longitudinal axis. These pivots (40, 50) constitute the articulation axis of asymmetrical cams (41, 51) extended by levers (42, 52). These asymmetrical cams (41, 51) engage in complementary surfaces formed by an annular groove (43) surrounding the outer surface of the male coupling.

Second Male Coupling

The second complementary connector (200) is also formed by a central connecting part and a peripheral connecting part.

The central connecting part consists of an inner sleeve (31) and an outer sleeve (32) intended to enclose the inner casing (3). These two sleeves (31, 32) are assembled by screwing screws (33, 58) also passing through a bore formed in the peripheral connecting part.

This peripheral connecting part is formed of a sleeve (56) extended on the distal side by a solid or split tubular skirt, which engages inside the outer casing (4), and a second sleeve (57) surrounding the outer surface of the outer casing (4).

Sealing Disc

The two female couplings and second connector define transverse surfaces traversed by a central port, allowing the flow of the central path (1) and axial ports formed in an annular part corresponding to the section between the outer casing (4) and the inner casing (3), and allowing the flow of the peripheral path (2). The inter-port seal is provided by a sealing disc (9) also having a central port (60) and peripheral ports (61 to 63).

Second Variant Embodiment

The second variant embodiment shown by FIGS. 5 to 8 differs from the first variant embodiment mainly by the locking mode: longitudinal in the first embodiment, locking is carried out longitudinally, by locks preventing axial separation; in the second embodiment, the locking is carried out angularly, with claws preventing axial separation when the claws are inserted radially. The other features are not systematically recalled for the second embodiment when they remain unchanged, and they are then transposable to this second embodiment.

The coupling is achieved by two complementary connecting rings (60', 70), one having alternating claws (72) and hollow space and the other alternating shoulder (61', 62'), and hollow space. The engagement of the two couplings is achieved by embedding the hollow spaces of the complementary connecting ring (60') with the alternating claws (72) then by applying a relative rotation so that the alternating shoulders (61', 62') of one of the couplings are positioned in the hollow of the alternating claws (72) and maintained in one direction by the semi-annular shoulder (74) of the alternating claws (72) and in the other direction by the peripheral edge (75) of the complementary coupling.

The invention claimed is:
1. A fluid connection system for connecting two two-phase flexible pipes each comprising two coaxial casings defining a central flow flowing into an inner casing and an annular flow flowing into a space between the inner casing and an outer casing, the connection system comprising:
  a first complementary connector and a second complementary connector;
  wherein the second complementary connector is configured to be attached to an end of a first two-phase flexible pipe of the two two-phase flexible pipes, and the first complementary connector is configured to be attached to an end of a second two-phase flexible pipe of the two two-phase flexible pipes, the first complementary connector and the second complementary connector having a locking mechanism for locking the first complementary connector and the second complementary connector together in an axial direction;
  wherein the first complementary connector has:
    a central connecting part having a distal end configured to ensure a sealed connection with an end of the inner casing of the second two-phase flexible pipe; and
    a peripheral connecting part having a distal end configured to ensure a sealed connection with an end of the outer casing of the second two-phase flexible pipe, the peripheral connecting part having an annular front inner flange, axially traversed by ports opening into a peripheral flow region;
    wherein the central connecting part and the peripheral connecting part are assembled to define a transverse coupling surface; and
  wherein the second complementary connector has:
    a central connecting part having a distal end configured to ensure a sealed connection with an end of the inner casing of the first two-phase flexible pipe; and
    a peripheral connecting part having a distal end configured to ensure a sealed connection with an end of the outer casing of the first two-phase flexible pipe, the peripheral connecting part having an annular front inner flange, axially traversed by ports opening into the peripheral flow region;
    wherein the central connecting part and the peripheral connecting part are assembled to define a second transverse front coupling surface; and
  wherein the central connecting part of the first complementary connector comprises an inner sleeve extended by a disc shoulder and a coaxial tubular outer sleeve having a plurality of axial threaded holes, the inner sleeve and the coaxial tubular outer sleeve being configured to enclose the end of the inner casing of the second two-phase flexible pipe.

2. The fluid connection system of claim 1, further comprising a sealing disc having an annular shape and including axial openings corresponding to the ports in the annular front inner flange of each of the first complementary connector and the second complementary connector.

3. The fluid connection system of claim 1, wherein the first complementary connector and the second complementary connector have a locking mechanism in an angular and axial direction by relative rotation of a coupling ring bearing alternating annular shoulders and intermediate space, with a complementary coupling ring bearing alternating claws having annular shoulders.

4. The fluid connection system of claim 1, wherein the peripheral connecting part of the first complementary connector comprises a sleeve having, on a distal side, a tubular lip having a diameter corresponding to an inner diameter of the outer casing, the sleeve having a plurality of axial threaded holes, the sleeve being extended on a proximal side by an inner collar traversed by axial holes, the inner collar defining a central port in a section corresponding to the section of the inner sleeve, the sleeve being extended on the proximal side by a locking collar defining a cavity for receiving the end of the second complementary connector; the peripheral connecting part further comprising a coaxial tubular outer sleeve having a plurality of axial holes, the sleeve and the coaxial tubular outer sleeve being configured to enclose the end of the outer casing of the second two-phase flexible pipe, the sleeve and the coaxial tubular outer sleeve being assembled by axial screws passing through the axial holes in the coaxial tubular outer sleeve to fit into the axial threaded holes of the sleeve.

5. The fluid connection system of claim 1, wherein the central connecting part and the peripheral connecting part of the first complementary connector are assembled by axial screws passing through a collar of the sleeve to fit into the axial threaded holes in the coaxial tubular outer sleeve of the central connecting part.

6. The fluid connection system of claim 1, wherein the central connecting part of the second complementary connector comprises an inner sleeve extended by a disc shoulder and a coaxial tubular outer sleeve having a plurality of axial holes, the inner sleeve and the coaxial tubular outer sleeve being configured to enclose the end of the inner casing of the first two-phase flexible pipe.

7. The fluid connection system of claim 1, wherein the peripheral connecting part of the second complementary connector comprises a sleeve having, on a distal side, a tubular lip having a diameter corresponding to an inner diameter of the outer casing, the sleeve having a plurality of axial threaded holes, the sleeve being extended on a proximal side by an inner collar through which axial holes pass, the inner collar defining a central port, the sleeve being extended on the proximal side by a locking collar defining a cavity for receiving the end of the second complementary connector; the peripheral connecting part further comprising a coaxial tubular outer sleeve having a plurality of axial holes, the inner sleeve and the coaxial tubular outer sleeve being configured to enclose the end of the outer casing of the second two-phase flexible pipe, the sleeve and the coaxial tubular outer sleeve being assembled by axial screws passing through the axial holes in the coaxial tubular outer sleeve to fit into the axial threaded holes in the sleeve.

* * * * *